US009633023B2

(12) United States Patent
Kelley et al.

(10) Patent No.: US 9,633,023 B2
(45) Date of Patent: Apr. 25, 2017

(54) EFFICIENT DVCS STORAGE SYSTEM

(71) Applicant: Microsoft Technology Licensing, LLC, Redmond, WA (US)

(72) Inventors: Philip W. Kelley, Pittsburgh, PA (US); Taylor Anthony Lafrinere, Cary, NC (US); Kevin Daniel Resnick, Apex, NC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 306 days.

(21) Appl. No.: 13/833,714

(22) Filed: Mar. 15, 2013

(65) Prior Publication Data

US 2014/0279973 A1    Sep. 18, 2014

(51) Int. Cl.
*G06F 17/30* (2006.01)
*G06F 9/44* (2006.01)

(52) U.S. Cl.
CPC .......... *G06F 17/30082* (2013.01); *G06F 8/71* (2013.01)

(58) Field of Classification Search
CPC ........................................................ G06F 8/71
USPC ........................................................ 707/695
See application file for complete search history.

(56) References Cited

U.S. PATENT DOCUMENTS

| 7,372,976 | B2 | 5/2008 | Rhoads et al. |
| 7,765,213 | B2 | 7/2010 | Loofbourrow et al. |
| 8,095,500 | B2 * | 1/2012 | Rose et al. .............. 707/609 |
| 8,165,998 | B2 * | 4/2012 | Semerdzhiev ............ 707/690 |
| 8,195,621 | B2 * | 6/2012 | Elisha et al. ............. 707/674 |
| 8,290,962 | B1 | 10/2012 | Chu |
| 8,645,416 | B2 * | 2/2014 | Rose et al. ............... 707/770 |
| 8,950,009 | B2 * | 2/2015 | Vijayan et al. .............. 726/31 |
| 8,959,067 | B1 * | 2/2015 | Patiejunas ......... G06F 17/30377 707/696 |
| 2005/0033720 | A1 | 2/2005 | Verma et al. |
| 2005/0050028 | A1 * | 3/2005 | Rose et al. .................. 707/3 |
| 2006/0020616 | A1 | 1/2006 | Hardy et al. |
| 2006/0026220 | A1 * | 2/2006 | Margolus .......... G06F 17/30368 |
| 2006/0179403 | A1 | 8/2006 | Kirkpatrick |
| 2007/0156726 | A1 * | 7/2007 | Levy ................. G06F 17/3002 |
| 2007/0260592 | A1 | 11/2007 | Anglin et al. |
| 2009/0083268 | A1 | 3/2009 | Coqueret et al. |

(Continued)

OTHER PUBLICATIONS

Narang, et al., "Highly Scalable Algorithm for Distributed Real-Time Text Indexing", In 16th International Conference on High Performance Computing, Dec. 16, 2009, 10 pages.

(Continued)

*Primary Examiner* — Baoquoc N To
(74) *Attorney, Agent, or Firm* — Workman Nydegger

(57) ABSTRACT

Searching for objects in a distributed version control system. A method includes accessing a single index. The single index indexes objects in a plurality of pack files. Each pack file is a single object container aggregating the content of what would otherwise be loose objects of a version control system within the single object container such that the single object container includes the aggregated content. The method further includes from the single index, determining a location of a version control system object by determining from the index which pack file from among the plurality of pack files the object is stored in, and a location in the pack file where the object is stored. The method also includes retrieving the version control system object from the pack file.

20 Claims, 2 Drawing Sheets

(56) References Cited

U.S. PATENT DOCUMENTS

| | | | |
|---|---|---|---|
| 2009/0150396 A1* | 6/2009 | Elisha et al. | 707/8 |
| 2009/0222434 A1 | 9/2009 | Fothergill | |
| 2012/0089585 A1* | 4/2012 | Rose et al. | 707/706 |
| 2012/0166513 A1* | 6/2012 | Fortune et al. | 709/201 |
| 2013/0262385 A1* | 10/2013 | Kumarasamy et al. | 707/634 |
| 2013/0262392 A1* | 10/2013 | Vibhor et al. | 707/654 |
| 2013/0263289 A1* | 10/2013 | Vijayan et al. | 726/31 |
| 2013/0275429 A1* | 10/2013 | York et al. | 707/737 |
| 2015/0113055 A1* | 4/2015 | Vijayan et al. | 709/203 |
| 2015/0340061 A1* | 11/2015 | Yang | G11B 20/10 369/85 |

OTHER PUBLICATIONS

"Index Object", Retrieved on: Mar. 11, 2013, Available at: http://msdn.microsoft.com/en-us/library/office/bb177495(v=office.12).aspx.

"Sun Master Data Management Suite Primer", Retrieved on: Mar. 11, 2013, Available at: http://docs.oracle.com/cd/E19509-01/820-5699/ref_mdm-primer-arch_c/index.html.

"Index Merging", Retrieved on: Mar. 11, 2013, Available at: http://sphinxsearch.com/docs/1.10/index-merging.html.

Majumdar, Dibyendu, "A Quick Survey of MultiVersion Concurrency Algorithms", Published on: Nov. 4, 2007, Available at: http://gsf.hhg.to/mvcc-survey-1.0.pdf.

Binder, et al., "Multiversion Concurrency Control for the Generalized Search Tree", In Journal of Concurrency and Computation: Practice & Experience, Feb. 13, 2009, 25 pages.

International Search Report & Written Opinion for PCT Patent Application No. PCT/US2014/023423, Mailed Date: Aug. 8, 2014, Filed Date: Mar. 11, 2014, 10 pages.

* cited by examiner

EFFICIENT DVCS STORAGE SYSTEM

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing system.

Interconnection of computing systems has facilitated distributed computing systems, such as so-called "cloud" computing systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Cloud and remote based service applications are prevalent. Such applications are hosted on public and private remote systems such as clouds and usually offer a set of web based services for communicating back and forth with clients.

File-based database systems rely on fast, random access disk access. A common cloud architecture has machines that do processing separated from those that store data. When this is the case, the usefulness of file-based databases is drastically reduced.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a distributed computing environment. The method includes acts for searching for objects in a distributed version control system. The method includes accessing a single index. The single index indexes objects in a plurality of pack files. Each pack file is a single object container aggregating the content of what would otherwise be loose objects of a version control system within the single object container such that the single object container includes the aggregated content. The method further includes from the single index, determining a location of a version control system object by determining from the index which pack file from among the plurality of pack files the object is stored in, and a location in the pack file where the object is stored. The method also includes retrieving the version control system object from the pack file.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Using distributed systems, multiple developers can collaborate to develop a single software application using the distributed system. To prevent conflicting development and otherwise control the development process, systems may implement distributed version control systems (DVCSs). The DVCS keeps track of software revisions and allows developers to work in a distributed fashion.

In DVCSs, objects are typically stored in pack files. A pack file is a single object container aggregating the content of what would otherwise be loose objects of a DVCS within the single object container. As such, the single object container includes the aggregated content. Examples of pack files are illustrated in FIG. 1.

Figure 1:
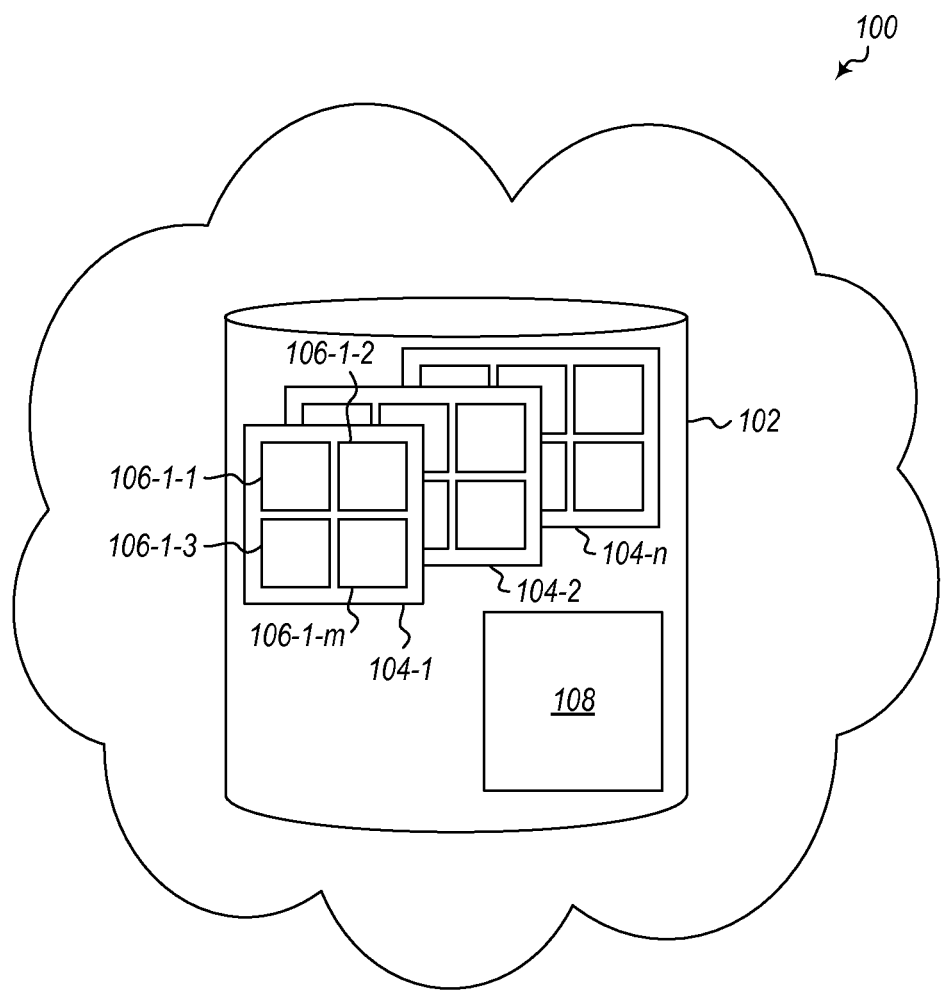
FIG. 1 illustrates a distributed version control system.

FIG. 1 illustrates a DVCS 100. The DCSC 100 may be distributed across a number of different machines in a distributed environment, such as a so called "cloud" environment. The DVCS 100 includes a storage system 102. For example, the storage system 102 may include one or more storage devices, such as hard drives, system memory, flash drives, etc. or combinations thereof. The storage system 102 stores a number of pack files 104-1, 104-2 through 104-*n* (but referred to herein generically as 104). Each of the pack files 104 stores a number of objects within the confines of the pack file itself. For example, pack file 104-1 stores objects 106-1-1, 106-1-2, 106-1-3 through 106-1-*m*. The objects in the pack file are referred to herein generically as 106. Objects that may be stored in a pack file include one or more blobs, one or more trees, one or more commits, one or more tags, etc. A blob is an opaque piece of data. A tree effectively lists the contents of one level of one folder. A commit has metadata about the commit (e.g. author, etc.), along with the list of parent commits, and the top-level tree. A tag has metadata about the tag (who created the tag, etc.), and points to the object being tagged.

Thus, some embodiments are implemented in a system which includes a file-based storage system where the data is stored in pack files that contain objects of different types and shapes. Notably, the pack files are not simply logical constructs, such as a folder, but are themselves actual objects which are composed of a number of other individual objects that could otherwise exist in a loose form.

In standard file-based storage systems used for DVCS there is an index file per pack file. Git is an open source example of a DVCS which uses a file-based data store where multiple objects are stored in a pack file. As noted, a pack file is a container for objects. And in particular, the pack file contains the actual objects. As noted, in previous systems, an index file per pack file was implemented where each index which lists what objects are in the pack file and where they are. To find an object, each index would be scanned until the object is found. If an object was not in an index, additional indexes would need to be scanned until an index containing the object was scanned.

However, one embodiment described herein includes a single index file 106 for multiple (or in some cases all) pack files 104 within a given storage system. Thus, instead of scanning multiple indexes looking for an entry, the sorted single index file 106 allows lookup of an entry to happen in log x time as opposed to x time where x is the number of objects in the system.

The index 108 stores metadata about the objects 106 in a plurality of pack files 104 in the storage system 100. This allows optimizations in decisions made about objects 106 without having to actually retrieve the objects 106. It also allows for advanced data transformations to happen quicker than storing the metadata with the objects 106 themselves. In some embodiments, the index 108 may be a flat file.

In some embodiments, the index 108 keeps an order of the objects 106 in the pack files 104. This allows for advanced manipulation of pack files without additional performance penalties. Ordering may be done in a number of different ways. For example, in some embodiments, ordering may be time based ordering where the order is based on the time when the object was created or modified. Alternatively or additionally, ordering may be name based ordering where objects are ordered alphabetically based on the names of the objects.

In some embodiments, the index 108 makes a distinction between original content that has been received and repacked content. Repacked content is content which has been manipulated by the source control system for whatever reason. This allows data cleanup algorithms to clean up stale data that has been generated without cleaning up original customer submissions. This provides a safety net in the case that data becomes corrupted.

In some embodiments, the index 108 format allows for the merging of indexes changes. This is beneficial when multiple processes are making changes to the stored content and the index 108. Instead of having a single writer blocking others, multiple writers can work without having to completely recalculate after other writers finish.

In some embodiments, the index 108 format is upgradable with multiple components that are configured to understand past versions. This allows a single writer of index files to work with different versions of index files at the same time. Upgradability may be facilitated by there being enough version information, along with schemas tied to each version, which allows embodiments to logically upgrade past versions to current versions Some embodiments may implement a configurable "soft-cap" for the size of the pack files 104 that are generated. This allows run-time tweaking of pack file size to optimize for pack-file transfer efficiency Thus, embodiments may implement a DVCS 100 that uses a single index 108 to store locations of objects 106, including which pack files 104 the objects 106 are stored in. Thus, information for objects distributed among multiple pack files 106 may be stored in a single location, allowing for efficient retrieval on slower storage systems. Further, extra metadata such as metadata regarding data transformations which have been applied, type information, graph information, or other data can be stored with the objects for extra metadata storage. This metadata may be useful pre-calculated information used as an accelerator or it may have extra information to enable various scenarios, such as merging, versioning, etc.

This index 108, in some embodiments, indicates an implicit ordering of objects by the order in which the pack files 104 are stored, followed by the order in which the objects 106 appear in a given pack file (e.g. 104-1), which allows for easy ways to prevent cycles when objects reference other objects. This also allows embodiments to combine, split, or reorder pack files 104 without significant penalty to improve performance. The storage representation of the index 108 is inconsequential (e.g. database, filesystem, etc.), as long as there is a single location for such an index 108 for multiple pack files. The index 108 itself can include multiple containers to separate metadata in various ways as long as there is a single, authoritative source for the index 108.

In some embodiments, the index 108 stores the following information in the following format:

Header: The header of the index 108 contains information about the version of the index file and the type of offsets it will use.

Pack files: The index 108 includes a list of pack files that contain the data.

Other files: The index 108 includes a list of files storing content in the data store 102.

Metadata for files: The index 108 includes the expiration time of pack files 104 along with the pack file 104 data manipulations. Data manipulation metadata that may be stored may indicate that a given pack file 104 is in its raw format in that it has not been changed since it was first received. Alternatively, data manipulation metadata may indicate that a pack file has been repacked. For example, the version control system may choose to make new packfiles that are logically equivalent to the old ones but may be more efficient or improved in some way. Alternatively, data manipulation metadata may indicate that a pack file has been redeltified. Objects are often stored as deltas against other objects. Redeltafying includes redoing processing to ensure a certain quality of deltas.

The index 108 includes a fanout table for quick lookup of objects. For example, in one embodiment, one fanout table is a list of 255 offsets followed by the count of total objects. Form the first byte of the object in question, one is subtracted, and reference is made to the list at that index. For example, if the first byte was 0x02, embodiments would look at index 1 for the offset, and can jump directly to that location in the list. Only 255 is needed and embodiments subtract 1, as the first byte of 0x00 will always be immediately after the table, and hence it is not needed to be stored. Finally, in the 256$^{th}$ value of the list is the total count of all objects.

Objects: The index 108 includes a list of all objects 106 stored in the data store 102.

The index 108 includes a list of locations of objects 106 in each pack file 104.

The index 108 includes a hash, such as the SHA1, of the contents of the index 108.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 2:
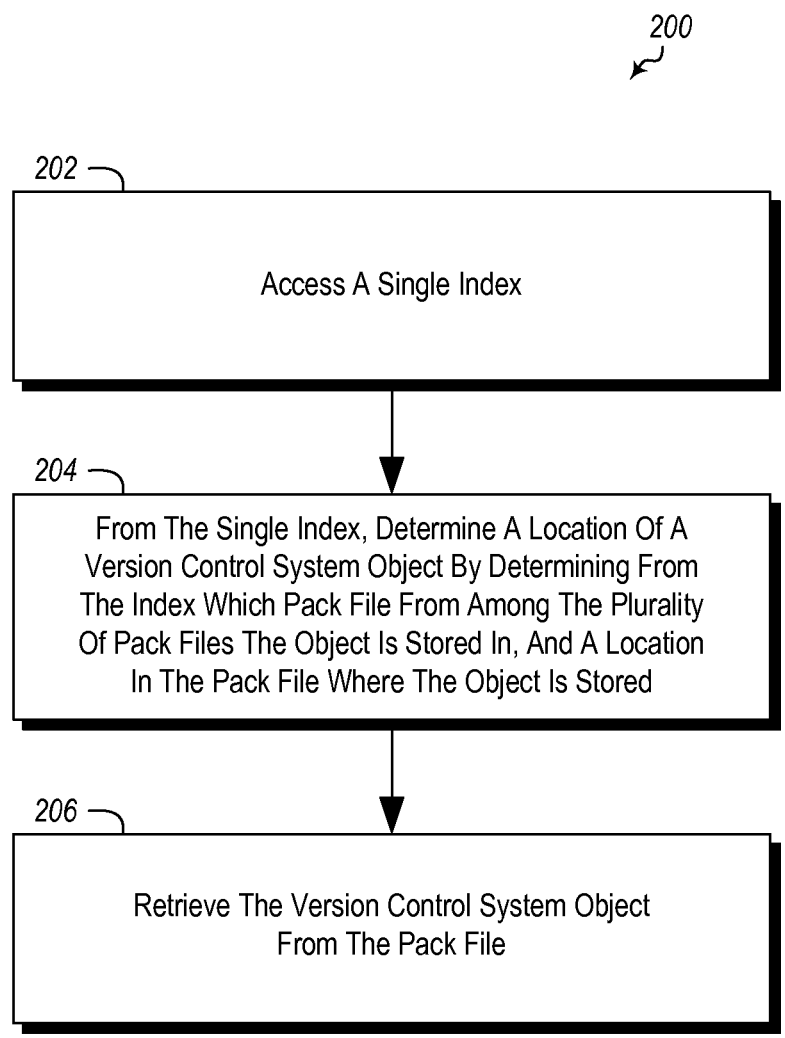
FIG. 2 illustrates a method of searching for objects in a distributed version control system.

Referring now to FIG. 2, a method 200 is illustrated. The method 200 includes acts for searching for objects in a distributed version control system. The method includes accessing a single index (act 202). The single index indexes objects in a plurality of different pack files. Each pack file is a single object container aggregating the content of what would otherwise be loose objects of a version control system within the single object container such that the single object container includes the aggregated content.

From the single index, the method 200 further includes determining a location of a version control system object by determining from the index which pack file from among the plurality of pack files the object is stored in, and a location in the pack file where the object is stored (act 204). For example, the index may include address entries for pack files and address entries within pack files for specific objects in the pack files. These entries can be used to find objects by determining which pack file they are in and where in a given pack file they exist.

The method 200 further includes retrieving the version control system object from the pack file (act 206). For example, the index 108 may be used to retrieve objects 106 from the pack files 104.

The method 200 may further include retrieving from the single index metadata about the pack file. Such metadata may include: data indicating that objects are sorted in the pack file by a time based ordering; data indicating that objects are sorted in the pack file by a name based sorting; data about transformation or data manipulations applied to the pack files; data about the expiration of the pack file so that the pack file can be cleaned up; and/or data indicating that the pack file has been repacked.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method implemented by a computing system that includes and utilizes one or more hardware processor for searching for objects in a distributed version control system, the method comprising:
   the computing system accessing a single index corresponding to a plurality of pack files, the single index indexing objects in a plurality of pack files and including a listing of pack files corresponding to the single index, wherein each pack file is a single object container that includes an aggregated portion of content that would otherwise be loose objects of a version control system, and wherein a soft-cap size corresponding to each pack file in the plurality of pack files is initially set but is later adjustable during run-time, the single index further including metadata for each of the pack files and objects within each of the pack files;
   the computing system, from the single index, determining a location of a version control system object by using the single index to identify which pack file from among the plurality of pack files the object is stored in, and a location in the identified pack file where the object is stored; and
   the computing system retrieving the version control system object from the identified pack file.

2. The method of claim 1, further comprising retrieving from the single index the metadata about the identified pack file.

3. The method of claim 2, wherein the metadata comprises data indicating that objects are sorted in the identified pack file by a time based ordering.

4. The method of claim 2, wherein the metadata comprises data indicating that objects are sorted in the identified pack file by a name based sorting.

5. The method of claim 2, wherein the metadata comprises data about transformation or data manipulations applied to the identified pack file.

6. The method of claim 2, wherein the metadata comprises data about the expiration of the identified pack file so that the identified pack file can be cleaned up.

7. The method of claim 2, wherein the metadata comprises data indicating that the identified pack file has been repacked.

8. A computer readable hardware storage device having stored thereon computer executable instructions that are executable by one or more processors of a computing system to cause the computing system to:
   access a single index for a distributed version control system corresponding to a plurality of pack files, the single index indexing objects that are located among a plurality of pack files and including a listing of pack files corresponding to the single index, wherein each pack file is a single object container that includes an aggregated portion of content that would otherwise be loose objects of a version control system, and wherein a soft-cap size corresponding to each pack file in the plurality of pack files is initially set but is later adjustable during run-time, the single index further including metadata for each of the pack files and objects within each of the pack files;
   from the single index, determine a location of a version control system object by using the single index to identify which pack file from among the plurality of pack files the object is stored in, and a location in the identified pack file where the object is stored; and
   retrieve the version control system object from the identified pack file.

9. The computer readable hardware storage device of claim 8, further comprising computer executed instructions that are executable by the one or more processors to cause the computing system to retrieve from the single index the metadata about the identified pack file to be performed.

10. The computer readable hardware storage device of claim 9, wherein the metadata comprises data indicating that objects are sorted in the identified pack file by a time based ordering.

11. The computer readable hardware storage device of claim 9, wherein the metadata comprises data indicating that objects are sorted in the identified pack file by a name based sorting.

12. The computer readable hardware storage device of claim 9, wherein the metadata comprises data about transformation or data manipulations applied to the identified pack file.

13. The computer readable hardware storage device of claim 9, wherein the metadata comprises data about the expiration of the identified pack file so that the identified pack file can be cleaned up.

14. The computer readable hardware storage device of claim 9, wherein the metadata comprises data indicating that the identified pack file has been repacked.

15. A version control system, the version control system comprising:
   one or more processors;
   a data store; and
   one or more computer-readable hardware storage devices having stored thereon computer-executable instructions that are executable by the one or more processors and that cause the version control system to instantiate the following:
     a plurality of pack files that are stored in the data store, wherein each pack file is a single object container that includes an aggregated portion of content that would otherwise be loose objects of a version control system, and wherein a soft-cap size corresponding to each pack file in the plurality of pack files is initially set but is later adjustable during run-time; and
     a single index, wherein the single index indexes objects in the plurality of pack files, the single index including a listing of pack files corresponding to the single index, the single index further including metadata for objects within each of the pack files.

16. The system of claim 15, wherein the index comprises metadata about each of the pack files in the plurality of pack files.

17. The system of claim 16, wherein the metadata comprises data indicating that objects are sorted in each of the pack files by a time based ordering.

18. The system of claim 16, wherein the metadata comprises data indicating that objects are sorted in each of the pack files by a name based sorting.

19. The system of claim 16, wherein the metadata comprises data about transformations or data manipulations applied to each of the pack files.

20. The system of claim 16, wherein the metadata comprises data about an expiration that corresponds to each of the pack files so that each of the pack files can be cleaned up according to the corresponding expiration.

* * * * *